US 8,297,925 B2

(12) United States Patent
Barrett

(10) Patent No.: US 8,297,925 B2
(45) Date of Patent: Oct. 30, 2012

(54) AEROFOIL CONFIGURATION

(75) Inventor: David W. Barrett, Derby (GB)

(73) Assignee: Rolls-Royce PLC, London (GB)

( * ) Notice: Subject to any disclaimer, the term of this patent is extended or adjusted under 35 U.S.C. 154(b) by 1350 days.

(21) Appl. No.: 12/000,867

(22) Filed: Dec. 18, 2007

(65) Prior Publication Data
US 2008/0170945 A1 Jul. 17, 2008

(30) Foreign Application Priority Data

Jan. 11, 2007 (GB) ..................... 0700499

(51) Int. Cl.
F01D 5/18 (2006.01)
(52) U.S. Cl. .......... 416/92; 416/97 R; 416/232; 416/500
(58) Field of Classification Search .................. 415/115; 416/92, 96 A, 97 R, 232, 233, 500
See application file for complete search history.

(56) References Cited

U.S. PATENT DOCUMENTS

| 3,171,631 | A | * | 3/1965 | Aspinwall | 416/90 R |
|---|---|---|---|---|---|
| 4,815,939 | A | * | 3/1989 | Doble | 416/233 |
| 4,940,388 | A | | 7/1990 | Lilleker et al. | |
| 5,246,340 | A | | 9/1993 | Winstanley et al. | |
| 5,738,493 | A | * | 4/1998 | Lee et al. | 416/97 R |
| 5,752,801 | A | | 5/1998 | Kennedy | |
| 6,089,826 | A | * | 7/2000 | Tomita et al. | 416/96 R |
| 6,132,174 | A | * | 10/2000 | Staub et al. | 416/96 R |
| 6,183,194 | B1 | * | 2/2001 | Cunha et al. | 415/115 |
| 6,206,638 | B1 | | 3/2001 | Glynn et al. | |
| 6,254,346 | B1 | | 7/2001 | Fukuno et al. | |
| 2003/0108422 | A1 | * | 6/2003 | Merry | 416/97 R |
| 2005/0281671 | A1 | | 12/2005 | Liang | |
| 2006/0239820 | A1 | * | 10/2006 | Kizuka et al. | 416/97 R |

FOREIGN PATENT DOCUMENTS

| EP | 1 267 040 A2 | 12/2002 |
|---|---|---|
| GB | 723 393 A | 2/1955 |
| GB | 741 508 A | 12/1955 |
| GB | 1 427 072 | 3/1976 |
| GB | 1 506 096 | 4/1978 |
| GB | 1 507 001 | 4/1978 |
| GB | 1 589 191 | 5/1981 |
| GB | 2 257 479 A | 1/1993 |

OTHER PUBLICATIONS

Jun. 7, 2012 European Search Report issued in EP 07 25 4882.

* cited by examiner

Primary Examiner — Edward Look
Assistant Examiner — Aaron R Eastman
(74) Attorney, Agent, or Firm — Oliff & Berridge, PLC

(57) ABSTRACT

A turbine blade comprising a pressure wall and a suction wall joined together at leading and trailing edges and having a root portion and a blade tip region, the walls further define a hollow chamber and through which cooling air is directed in use from the root portion to the blade tip region only, characterized in that at least one of the walls defines at least one cooling rib that extends outwardly from the wall into the chamber and at least a portion of the rib tapers between the root portion and a blade tip region.

18 Claims, 5 Drawing Sheets

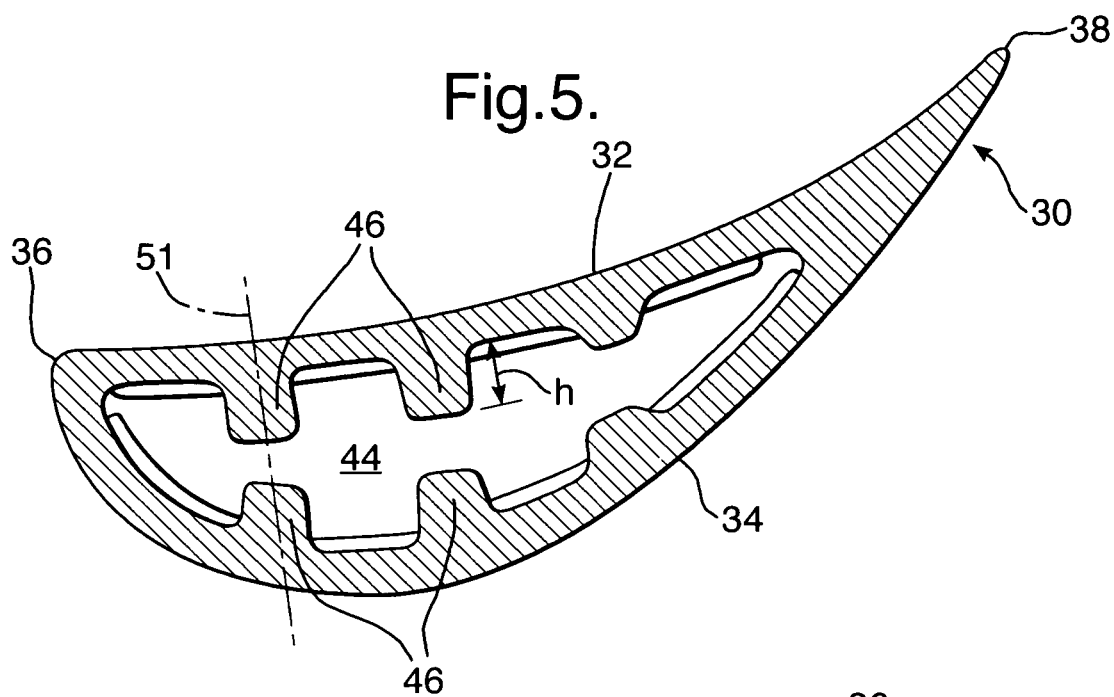
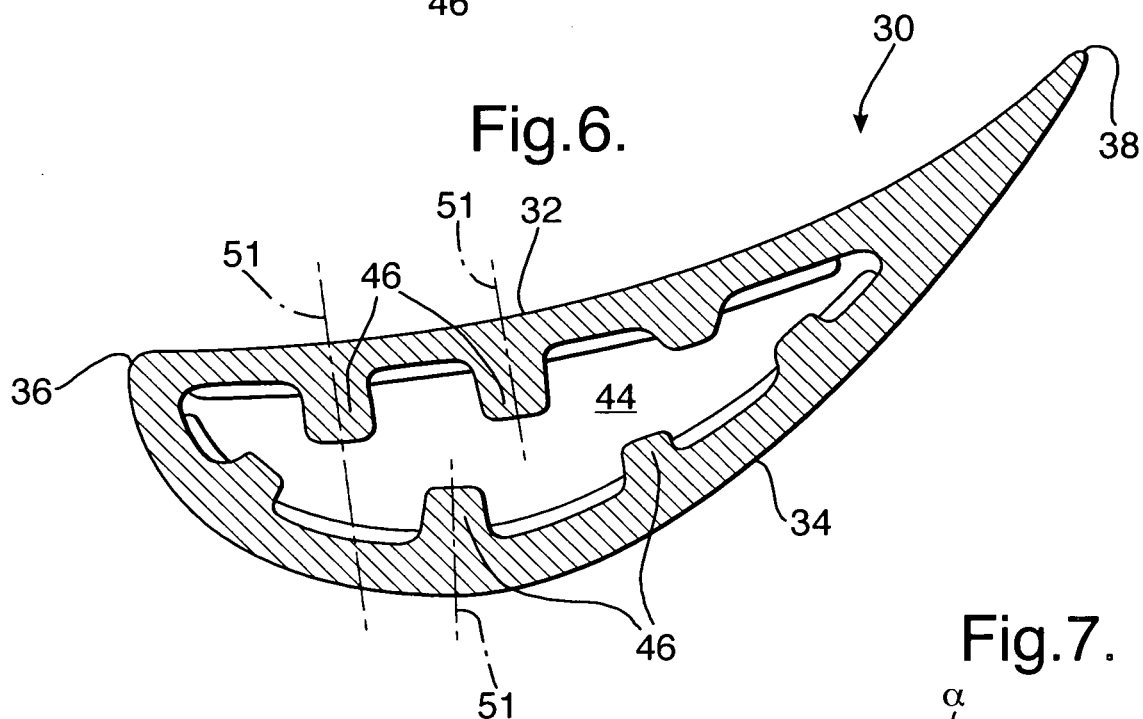
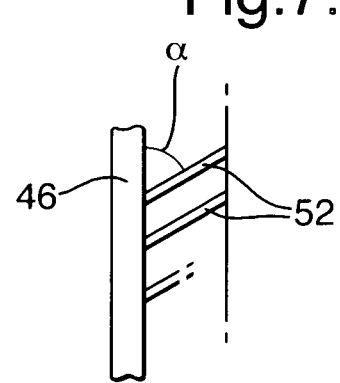

AEROFOIL CONFIGURATION

The present invention relates to aerofoil structures for a gas turbine engine and in particular but not exclusively a turbine blade aerofoil.

Certain turbine blades of a gas turbine engine comprise a single hollow passage through the center of their aerofoil. These blades are not provided with cooling fluid as they are typically not in the very hottest high pressure turbine. The blade aerofoil is designed with a minimum wall section thickness necessary to carry the tip shroud, at all engine operational levels of stress and temperatures, to give a desired blade life. This also ensures the blade, one of an annular array of blades, is as light as possible in order to minimize the loading of its rotor disc.

The disadvantage of this aerofoil arrangement is that if the blade is required to operate at higher levels of engine performance, either elevated blade speed and/or elevated gas temperatures it has a limited capability to be cooled (via compressor bleed air) to maintain an acceptable blade life. The introduction of cooling air into such a blade is very inefficient in terms of engine cycle performance impact and cooling effectiveness of the blade.

Therefore the current blade design has very little development capability, and is restricted to a level of turbine entry temperature that can be achieved.

High-pressure turbine (HPT) blades require substantial amounts of cooling fluid and comprise complex multi-pass or serpentine cooling passages. One such HPT blade is disclosed in U.S. Pat. No. 4,940,388. Where a blade is not used in such high temperature regions this type of blade is considerably over designed and costly to produce as well as being unnecessarily heavy.

Therefore it is an object of the present invention to provide a cooling arrangement for a blade that gives a higher cooling effectiveness capability without additional parasitic weight.

In accordance with the present invention a turbine blade comprising a pressure wall and a suction wall joined together at leading and trailing edges and having a root portion and a blade tip region, the walls further define a hollow chamber and through which cooling air is directed in use from the root portion to the blade tip region only, at least one of the walls defines at least one elongate and radially extending rib having a width and height from the wall into the chamber and characterised in that at least a portion of the rib tapers between the root portion and a blade tip region.

Preferably, the rib extends from the root portion and carries principal loads from the wall to the root portion.

Preferably, the rib tapers, radially outwardly, in its height and/or its width.

Normally, at least one rib is provided on each the pressure and suction side walls, but preferably two or more ribs are provided on either wall.

Preferably, at least one rib on one wall is directly opposite another rib on the other wall. Alternatively, at least one rib on one wall is offset from another rib on the other wall.

Preferably, turbulators extend between adjacent ribs on one wall.

Possibly, a plurality of turbulators is provided over the entire radial height of a wall.

Possibly, the turbulators generally reduce in height, from the wall, in the direction from the root portion to the tip region.

Alternatively, each consecutive turbulator reduces in height, from the wall, in the direction from the root portion to the tip region.

Preferably, the turbulators are between 5 and 25% the height of the adjacent part of the ribs.

Preferably, the turbulators are generally normal to the ribs.

Alternatively, the turbulators are angled relative to the ribs and may be angled between 10 and 60 degrees relative to the ribs.

The present invention will be more fully described by way of example with reference to the accompanying drawings in which:

FIG. 5 is a section A-A through the turbine blade in FIG. 2 showing a first arrangement of ribs in accordance with the present invention;

FIG. 6 is a section A-A through the turbine blade in FIG. 2 showing a second arrangement of ribs in accordance with the present invention;

FIG. 7 is an enlarged view of a rib and an array of turbulators in accordance with the present invention.

Figure 1:
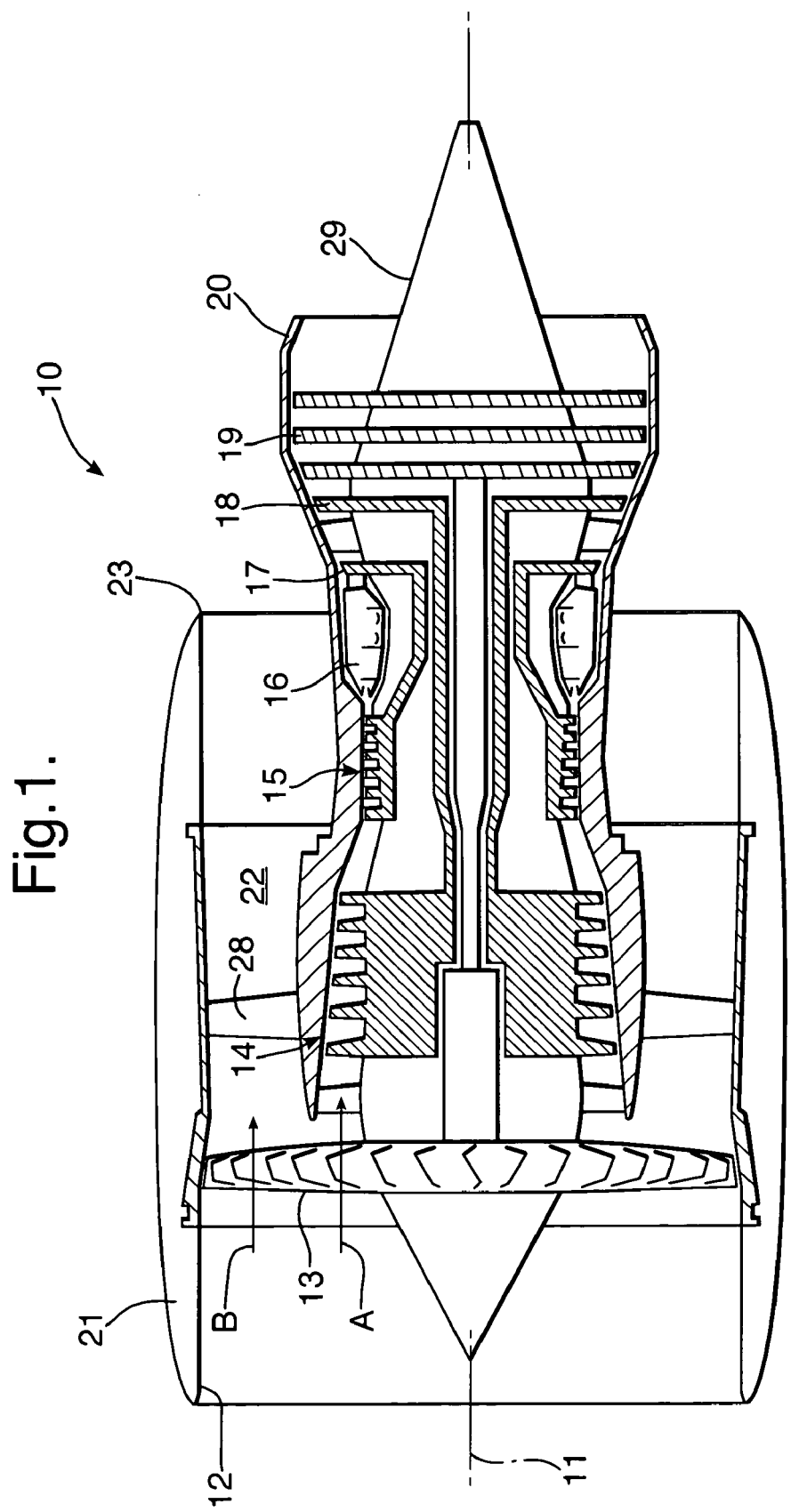
FIG. 1 is a schematic section of part of a ducted fan gas turbine engine.

Referring to FIG. 1, a ducted fan gas turbine engine generally indicated at 10 has a principal and rotational axis 11 and is suspended from an aircraft via a pylon. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core exhaust nozzle 20.

A nacelle 21 generally surrounds the engine 10 and defines the intake 12, a bypass duct 22 and a bypass nozzle 23. A centre-plug 29 is positioned within the core exhaust nozzle 20 to provide a form for the core gas flow to expand against and to smooth its flow from the core engine. The fan 13 is circumferentially surrounded by a structural member in the form of a fan casing 24, which is supported by an annular array of outlet guide vanes 28.

The gas turbine engine 10 works in the conventional manner so that air entering the intake 11 is accelerated by the fan 13 to produce two air flows: a first airflow A into the intermediate pressure compressor 14 and a second airflow B which passes through a bypass duct 22 to provide propulsive thrust. The intermediate pressure compressor 14 compresses the airflow A directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

Figure 2:
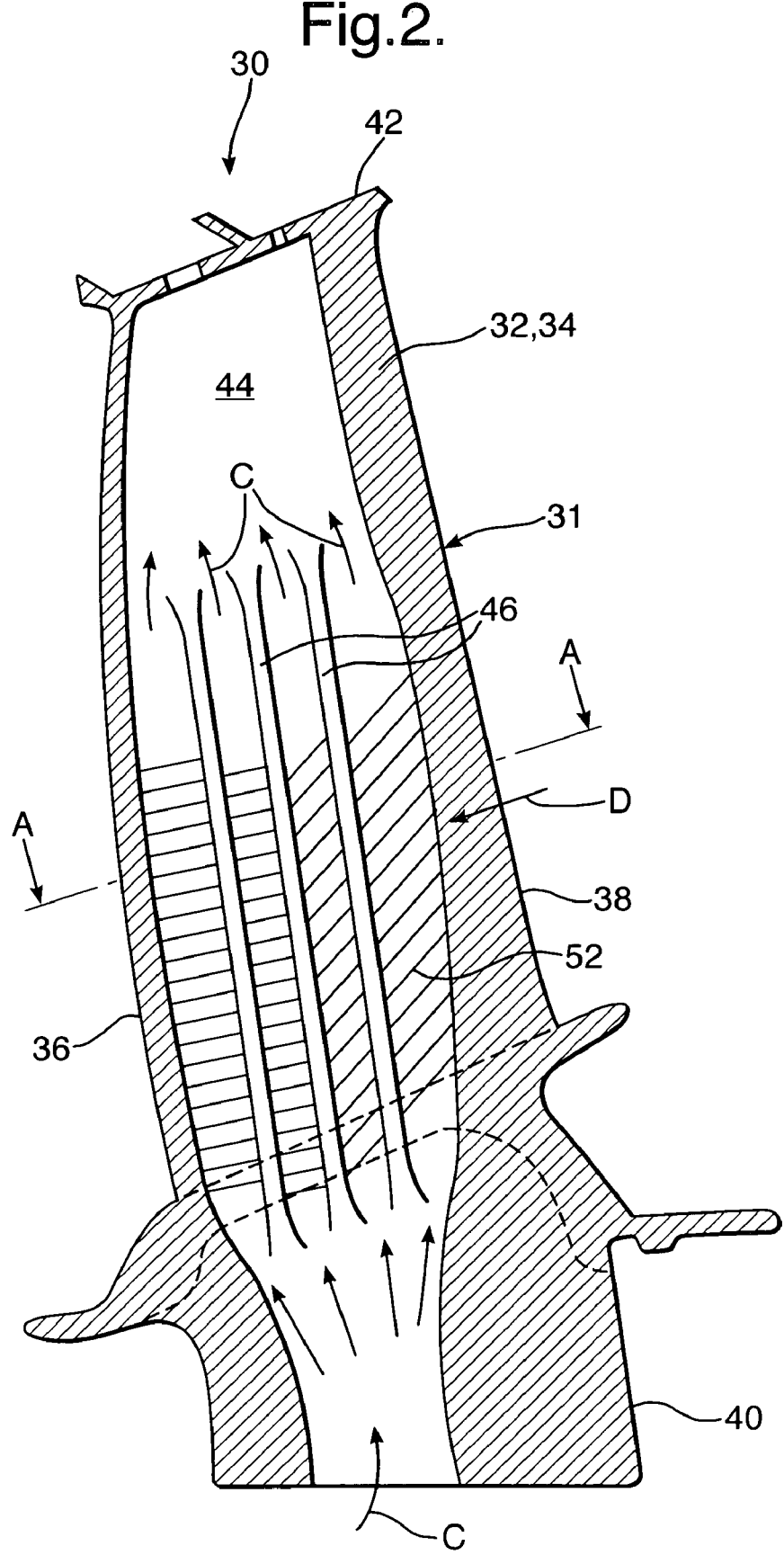
FIG. 2 is a cut away view of a turbine blade in accordance with the present invention.

The turbines 17, 18, 19 each comprise an annular array of radially extending blades 30, one of which is shown in FIG. 2, and is mounted to a rotor disc (not shown) in a conventional manner. This particular blade 30 is one of the IP turbine blade array, but could equally be one of the HP or LP turbine blades. The blade 30 comprises an aerofoil 31 defined by a pressure side wall 32 and a suction side wall 34 joined together at leading and trailing edges 36, 38 (see FIG. 5) and having a root portion 40 and a blade tip region 42. The pressure and suction walls 32, 34 define a hollow chamber 44 through which cooling air is directed (arrow C) in use from the root portion 40 to the blade tip region 42 only. Note that there is no distribution or flow of cooling fluid in the direction towards the root 40 from the tip 42.

The present invention relates to an internal strengthening and cooling arrangement of the blade 30. This arrangement comprises at least one of the walls 32, 34 defining at least one rib 46 that extends outwardly (its height, h in FIG. 3) from the wall 32, 34 into the chamber 44 and at least a portion of the rib 46 tapers between the root portion 40 and a blade tip region 42. Not only does the rib 46 increase the surface area of the chamber 44 to increase heat transfer to the cooling fluid C, but also as the rib 46 extends from the root portion 40 it carries principal loads from the wall 32, 34 to the root portion 40 and into the rotor disc.

Figure 3:
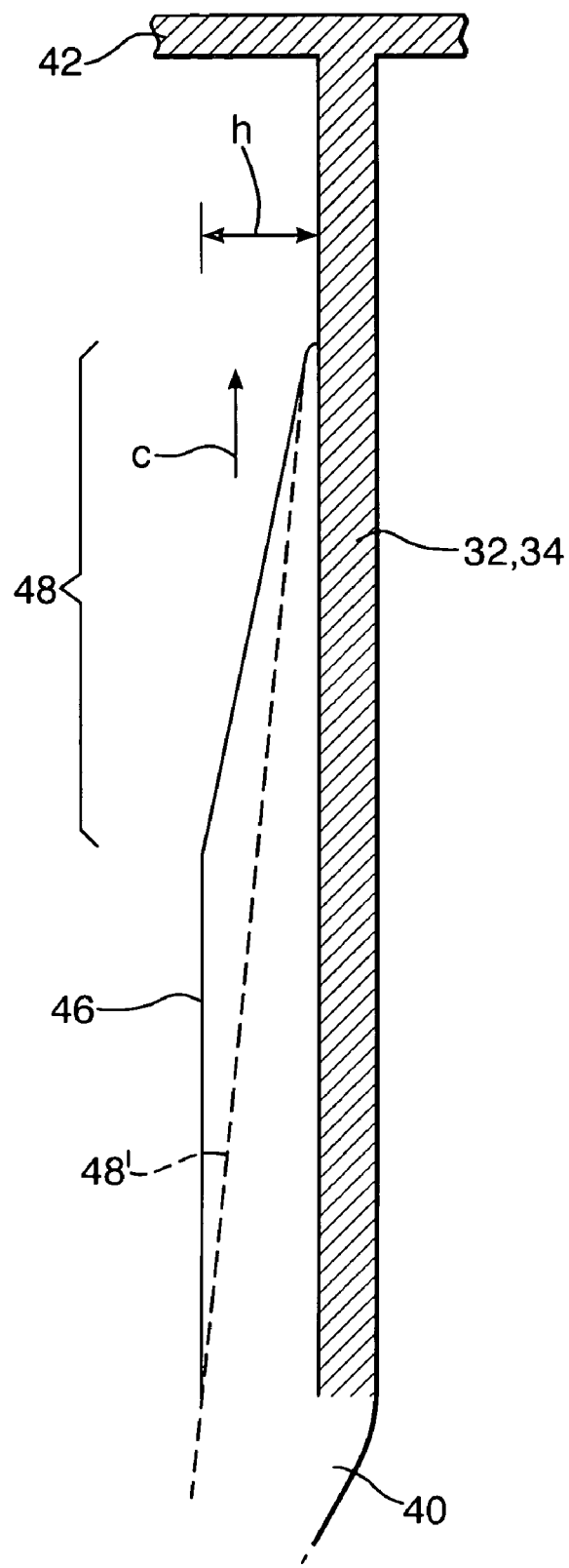
FIG. 3 is a view on arrow D showing a tapering rib in accordance with the present invention.

The rib 46 or ribs 46 on each wall 32, 34 taper in height h as shown in FIG. 3. Depending on the blade's particular characteristics, rotational speed and thermal exposure the tapering portion 48 may start part way along the radial extent of the rib 46 and stop before the tip region 42. Alternatively, the tapering portion 48 may extend all the way to the tip portion 42 where it blends out. The tapering portion 48' may also begin from the root portion 40 as shown by the dashed line 48'.

Figure 4:
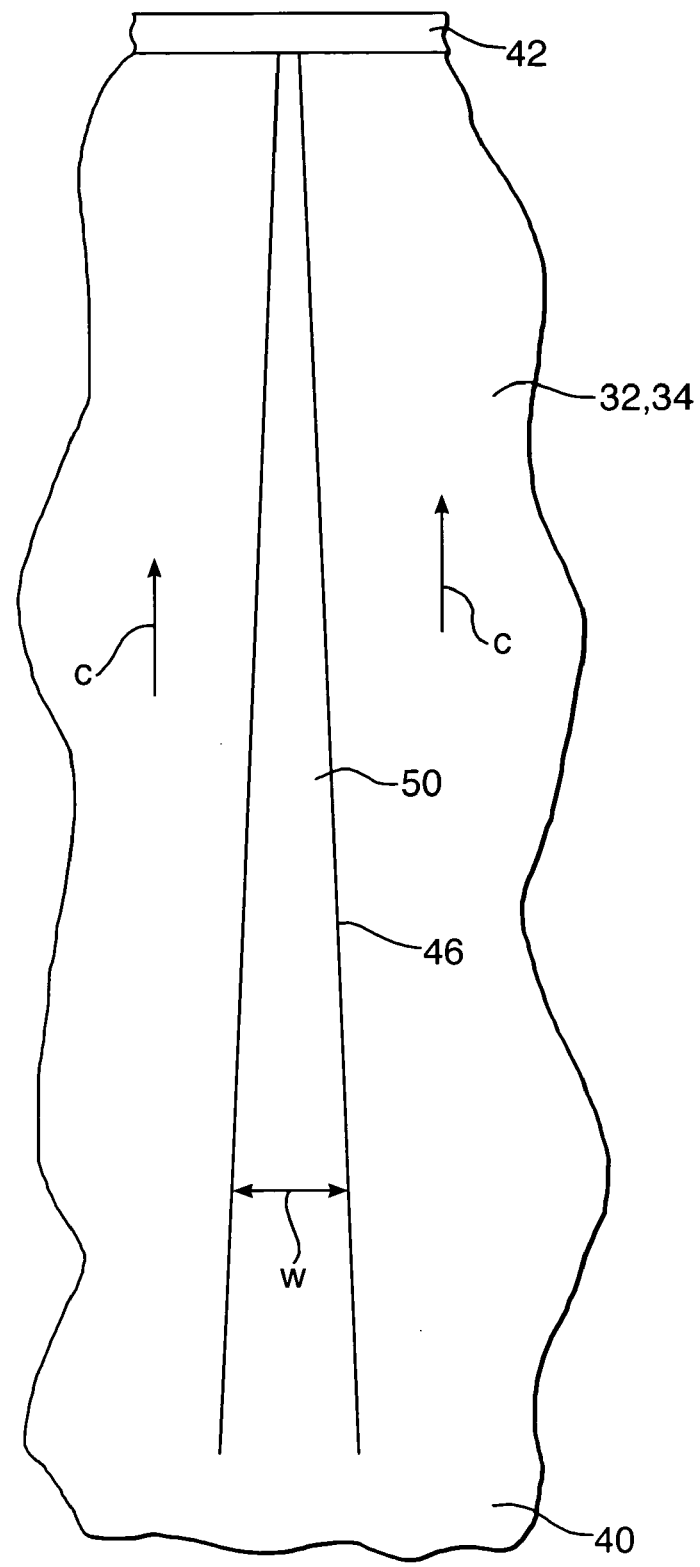
FIG. 4 is an enlarged view of an alternative tapering rib seen in FIG. 2 in accordance with the present invention.

Alternative to the taper in height, or in combination therewith, the rib 46 tapers in width w, shown in FIG. 4, between the root portion 40 and tip portion 42. The taper 50 extends over the whole of the of the rib 46, however, similar to the FIG. 3 embodiment, the taper in width may only extend over a part of the radial extent of the rib 46. The rib 46 may extend only over a part of the radial extent of the aerofoil 31.

Referring now to FIGS. 5 and 6, which show two arrangements of ribs 46 on both walls 32, 34 of the turbine blade 30. In the FIG. 5 embodiment, at least one rib 46 on one wall 34 is positioned directly opposite another rib 46 on the other wall 34. The maximum height of the rib may be up to 40% the width of the chamber 44 measured along a centre-line 51 of the rib 46. A preferable height of the rib is 30% of the chamber width 44.

In the FIG. 6 embodiment at least one rib 46 on one wall 34 is offset another rib 46 on the other wall 34. Because of the offset, the maximum height of the rib 46 may be greater and preferably up to 60% the width of the chamber 44 measured along a centre-line 51 of the rib 46. A preferable maximum height of the rib is 30% of the corresponding chamber width 44. Thus with the offset ribs 46, greater surface area for cooling and more tailored structural cross-sectional area for carrying loads may be provided.

Referring back to FIG. 2, additional cooling is achieved by the provision of turbulators 52 that extend between adjacent ribs 46. The turbulators 52 disturb the cooling fluid creating turbulence and vortices that improve heat removal from the wall 32, 34.

The turbulators 52 are provided over part of the radial height of the wall or rib 46 or may extend over the entire radial height of a wall 32, 34. The turbulators are provided between each adjacent rib 46, but may be preferentially provided where the blade 30 is subject to hotter main gas flow A, usually at the leading edge region 36.

The turbulators 52 are of a constant height, but may generally reduce in height, as cooling requirements diminish, and usually in the direction from the root portion 40, to the tip region 42. More specifically, each consecutive turbulator 52 reduces in height.

The turbulators 52 are between 5 and 25% the height of the adjacent or joining part of the ribs 46. The turbulators 52 may be generally normal to the ribs 46, but preferably are they are angled relative to the ribs as shown in FIG. 7 to cause increased turbulence. The angle α of the turbulator relative to the rib 46 is between 10 and 60 degrees and more usually between 30 and 45 degrees.

The present invention provides the key advantages of the blade having an enhanced cooling effectiveness capability without additional parasitic weight as would be the case for a turbine blade in accordance with the teachings of U.S. Pat. No. 4,940,388 for example. As the ribs also carry stresses, when the blade does not require cooling its low weight configuration does not impact on blade or disc life. This is significant advantage over current prior art aerofoils as it gives flexibility for later version of an engine for thrust growth, increased blade life, and can accommodate changes in combustor traverse temperatures. This design is therefore ideally suited to blades that are cooled only during periods of the engine cycle, for example at take-off where the engine is at maximum speeds.

Other benefits of varying rib height and/or width allow the configuration to be matched to gas temperature profiles with required cooling effectiveness to maximize life. The ribs can be blended into wall without stress concentrations.

I claim:

1. A turbine blade for use on a rotor, the blade comprising:
   a pressure wall;
   a leading edge;
   a trailing edge;
   a root portion;
   a blade tip region; and
   a suction wall,
   wherein the pressure wall and the suction wall are joined together at the leading and trailing edges,
   the pressure wall and the suction wall define a hollow chamber through which cooling air is directed in use from the root portion to the blade tip region only,
   at least one of the pressure wall and the suction wall defines a plurality of elongate and radially extending ribs having a width and height, each of the ribs extending from one of the pressure wall and the suction wall into the hollow chamber, and
   at least a portion of each of the plurality of ribs tapers in the radial direction between the root portion and the blade tip region.

2. The turbine blade according to claim 1 wherein the ribs extend from the root portion and carries principal loads from the wall to the root portion.

3. The turbine blade according to claim 1 wherein the ribs taper, radially outwardly, in width.

4. The turbine blade according to claim 1 wherein the ribs taper, radially outwardly, in height.

5. The turbine blade according to claim 1 wherein at least one rib is provided on each the pressure and suction side walls.

6. The turbine blade according to claim 1 wherein two or more ribs are provided on either the pressure or suction side walls.

7. The turbine blade according to claim 1 wherein at least one rib on one wall is directly opposite another rib on the other wall.

8. The turbine blade according to claim 1 wherein at least one rib on one wall is offset from another rib on the other wall.

9. The turbine blade according to claim 1 wherein turbulators extend between adjacent ribs on one wall.

10. The turbine blade according to claim 9 wherein a plurality of turbulators is provided over the entire radial height of a wall.

11. The turbine blade according to claim 9 wherein the turbulators generally reduce in height, from the wall, in the direction from the root portion to the tip region.

12. The turbine blade according to claim 9 wherein each consecutive turbulator reduces in height, from the wall, in the direction from the root portion to the tip region.

13. The turbine blade according to claim 9 wherein the turbulators are between 5 and 25% the height of the adjacent part of the ribs.

14. The turbine blade according to claim 9 wherein the turbulators are generally normal to the ribs.

15. The turbine blade according to claim 9 wherein the turbulators are angled relative to the ribs.

16. The turbine blade according to claim 15 wherein the turbulators are angled between 10 and 60 degrees relative to the ribs.

17. The turbine blade according to claim 15 wherein the turbulators are angled between 30 and 45 degrees relative to the ribs.

18. A gas turbine engine comprising an array of turbine blades, at least one blade in accordance with claim 1.

* * * * *